March 31, 1942. J. W. WILKINSON 2,277,737
OIL FILTER MOUNTING
Filed Aug. 4, 1939 2 Sheets-Sheet 1
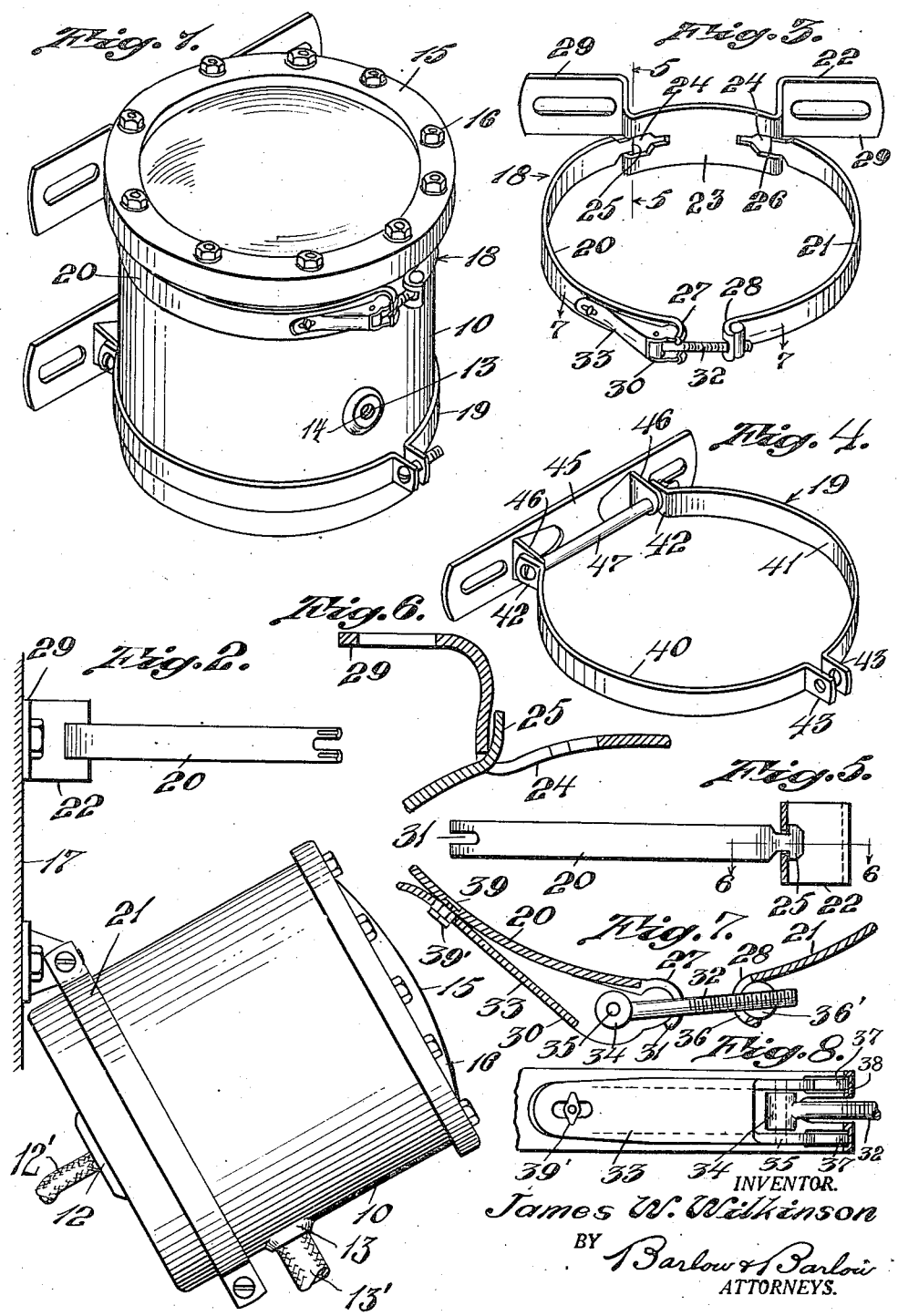

March 31, 1942.　　J. W. WILKINSON　　2,277,737
OIL FILTER MOUNTING
Filed Aug. 4, 1939　　2 Sheets-Sheet 2
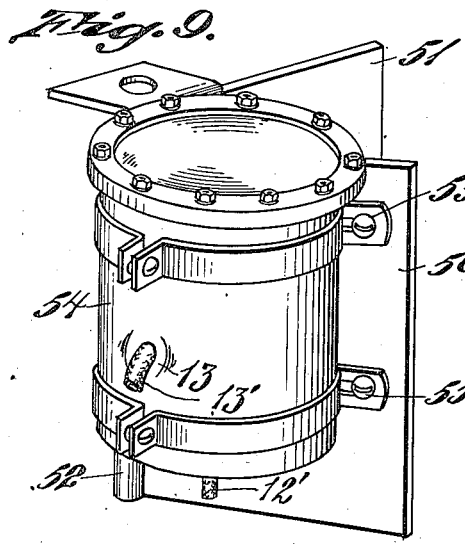
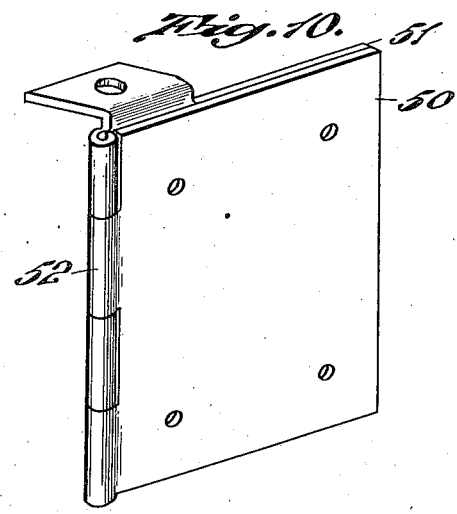
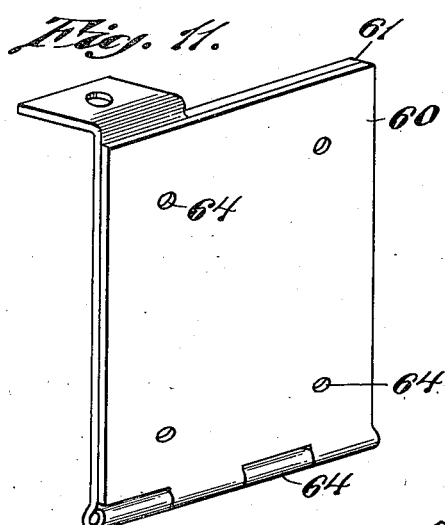
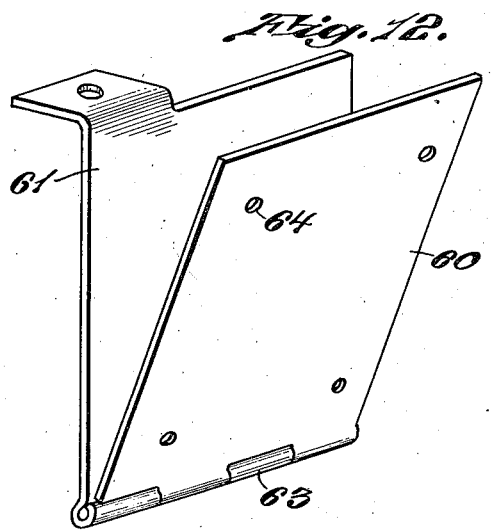
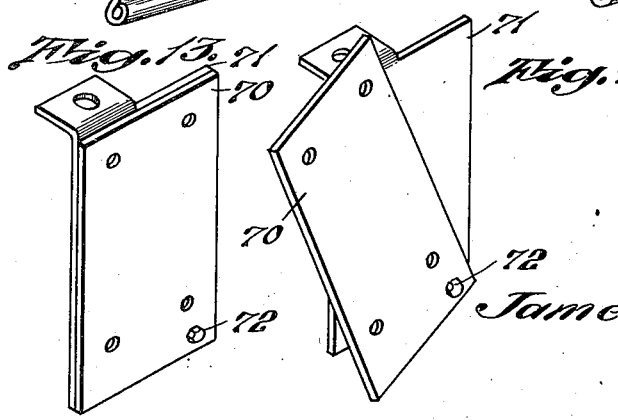
INVENTOR.
James W. Wilkinson
BY Barlow & Barlow
ATTORNEYS.

Patented Mar. 31, 1942

2,277,737

UNITED STATES PATENT OFFICE 2,277,737

OIL FILTER MOUNTING

James W. Wilkinson, Providence, R. I., assignor to Fram Corporation, a corporation of Rhode Island Application August 4, 1939, Serial No. 288,374

2 Claims. (Cl. 210—62)

This invention relates to oil filters, and in particular to oil filters of the type used in continuous, pressure-lubricating systems of internal combustion engines; and has for one of its objects the mounting of an oil filter of the above class in such a manner that it is capable of being moved bodily into a position different from its normal operating position for facilitating either insertion or withdrawal of the filter cartridge unit from the casing when the filter is installed in a restricted location.

Another object of the invention is the convenient moving of the entire filter assembly from its normal operating position to a different position of ready accessibility for inspection and/or replacement of the filtering element.

Another object of the invention is the provision of a mounting construction by which the filter assembly may be moved bodily from a correct operating position where there is no room to permit removal or inspection of the filtering element, into a different and more accessible position without necessitating the disconnection of the fluid piping or conduits connecting the filter to the fluid lubricating system of the internal combustion engine, and without being required to manually support the weight of the filter at any time while it is removed from its normal operating position.

Another object of the invention is to mount the entire filter assembly for movement into a cartridge inspection and/or replacement position at a different level than that at which the filter is normally positioned in its required operating position.

Another object of the invention is to provide a mounting of the above character whereby pivotal movement of the entire assembly bodily into a position removed from its normal operating position for effecting replacement and/or inspection of the filter cartridge.

Another object of the invention is the provision of a detachable filter mounting device in which the entire weight of the filter assembly will be borne by the connecting means for holding the separable parts of the mounting together and in which the securing means for maintaining such separable parts of the mounting in an abutting relationship will be entirely free from any applied pressure incident to the weight of the filter.

With these and other objects in view, the invention consists of certain novel features of construction, as will be more fully described, and particularly pointed out in the appended claims.

In the accompanying drawings:

Fig. 1 is a perspective view of a filter assembly attached to a mounting device embodying my invention;

Fig. 2 is a side elevational view of the filter and the mounting device represented in Fig. 1 and showing the filter and part of the mounting swung into a position for inspection or replacement of the filtering element;

Fig. 3 is a perspective view of the upper clamp for securing the casing to the mounting device and showing the construction of the toggle mechanism for tightening the clamp against the casing;

Fig. 4 is a perspective view of the lower clamp member for securing the casing to the mounting device and showing the pivoted arrangement of the bracket;

Fig. 5 is a sectional view taken substantially on the line 5—5 of Fig. 3;

Fig. 6 is an enlarged sectional view taken on the line 6—6 of Fig. 5;

Fig. 7 is an enlarged transverse sectional view taken substantially on the line 7—7 of Fig. 3;

Fig. 8 is a front elevational view of a portion of the toggle device shown in Fig. 7;

Fig. 9 is a perspective view of a modified form of mounting device showing the same with the filter attached and moved into an opening position;

Fig. 10 is a perspective view of the mounting device shown in Fig. 9 without the filter and moved into an operating position;

Fig. 11 is a perspective view of another modified form of mounting, showing the same in an operating position;

Fig. 12 is a perspective view of the mounting device shown in Fig. 11 and represented in an opening position;

Fig. 13 is a perspective view of another modified construction of mounting device and showing the same in an operating position; and Fig. 14 is a perspective view of the modification shown in Fig. 13.

The ordinary filter mountings hitherto used for installing the large size oil filters of the type required in the lubricating circulating systems of the internal combustion engines of trucks, busses and tractors do not fill all requirements met with in the field as it is often necessary, especially in motor truck or bus designs of the "cab over engine" type, to install and operate such oil filters in locations where there is practically no overhead clearance or space between the top of the filter and the adjacent parts of the engine chassis or body of the vehicle, in which instance there is no room to permit the withdrawal of the entire filter cartridge unit for inspection and/or replacement when a filter is mounted in such confined locations; and in order to overcome such difficulties I have provided a mounting device for supporting and sustaining the filter unit in its proper operating position during its normal operation and use, and also capable of being moved into a different position and/or at a different level in order to present the top of the filter casing in a more accessible position to facilitate the easy removal and insertion of the filter cartridge unit for inspection and/or replacement when the filter becomes clogged or whenever desired; and this mounting device comprises a hinged support formed of two relatively movable members one of which is fixedly secured to the engine or to a part of the vehicle and the other member carrying the filter casing and capable of pivotal movement on the fixed member in a direction such that it will present the top of the filter casing at a different level and/or into an accessible position for either the removal or the insertion of the filter cartridge unit with respect to the casing; and the following is a more detailed description of the present embodiment of this invention, illustrating the preferred means by which these advantageous results may be accomplished:

With reference to the drawings 10 designates the filter casing which is of generally cylindrical shape open at the top and having a bottom wall with a central boss 12 adapted for the connection of a flexible conduit 12' thereto, and a boss 13 on the side wall of the casing having an opening 14 which is threaded internally for the connection of a flexible conduit 13' to the casing in which the conduits 12' and 13' communicate with the lubricating system of the internal combustion engine. A removable cover 15 is detachably secured over the open end of the casing 10 by means of suitable bolts 16 for completely enclosing the removable filter cartridge unit (not shown) after it has been placed in its correct operating position within the casing.

As illustrated in Figs. 1 to 8, the casing 10 is arranged for pivotal movement with respect to a fixed support 17, such as the engine block or a part of the frame of a motor vehicle, on which the mounting device of the instant invention is mounted; and in order to obtain this desired result I have provided a plurality of separable and independent clamping members which are generally designated 18 and 19 respectively, and they are clamped in spaced relation one above the other about the exterior surface of the casing 10.

The upper clamping member 18 is shown in Fig. 3 as consisting of a pair of generally arcuate shaped metal straps or bands 20 and 21 respectively which embrace the casing at opposite sides thereof, the curvature of the arcuate portion of which corresponds substantially to the general curvature of the outside surface of the casing 10.

The straps 20 and 21 respectively are loosely pivoted at one end on a bracket or base 22 which is provided intermediate its ends with an outwardly extending generally U-shaped channel 23 having a concaved bottom wall, the end corners of which at the meeting point of the bottom and side walls are inwardly slotted as indicated at 24 to provide a pair of connected openings of two different sizes, the outer one of which being of greater width and length than the inner slot so as to permit insertion into pivotal relation with the channel of the bracket of the enlarged lugs 25 and 26 which are formed at the pivot ends of the straps 20 and 21 respectively. Flanges 29 at the opposite ends of the bracket 22 are suitably slotted for attachment of the bracket by bolting of the same to a fixed support 17, as indicated in Fig. 2. The forwardly extending free ends of the straps 20 and 21 are formed with outwardly extending oppositely curved hooks 27 and 28 which are drawn together by a toggle device 30. The hook 27 is slotted inwardly from its front edge as at 31 for the detachable reception of the draw bolt 32 of the toggle device 30 for drawing the straps 20 and 21 toward each other into tight gripping engagement with the outside of the casing when the straps are in an embracing relation with the same, and with the toggle lever 33 moved inwardly beyond its pivot center to set up the required toggle action.

The toggle device 30 comprises the draw bolt 32 which, as above stated, passes through the slot 31 in the hooked portion 27 of the strap 20 and by means of the eye 34 and the pin 35 is pivotally connected to the toggle lever 33. The free end of the bolt 32 projects through a slot 36 formed in the hook 28 of the strap 21 while a cylindrical nut 36' carried by the projecting end of the bolt 32 has interfitting engagement with the inner concaved surface of the hook 28. Formed on the fulcrum end of the toggle lever 33 and near the pivot 35 are a pair of spaced arms 37 the ends of which are rounded and have engagement with the concave surface of the grooved portion 38 of the concave portion of the hook 27 of the strap 20, whereby inward movement of the toggle lever 33 toward the strap 20 into substantial engagement with the same will act by reason of the rounded portion of the arms 37 of the toggle lever, to cause a relative movement of the straps 20 and 21 toward each other and draw them tightly against the outer surface of the casing. A pin 39 pivotally mounted at one end on the strap 20 is provided at its other end with an enlarged head 39' of elongated formation adapted to pass freely through a suitable slot in the toggle lever 33 and engage the outer face of the toggle lever 33 upon twisting of the head 39' and the pin 39 through 90° so as to maintain the toggle device in a clamping position.

As illustrated in Figs. 2 and 4, the lower clamping member 19 comprises a pair of generally arcuate metal straps or bands 40 and 41 respectively, the curvature of the arcuate portions of which conforms substantially to curvature of the exterior cylindrical surface of the casing 10. The straps or bands 40 and 41 respectively are of duplicate construction and each comprises a curved intermediate portion with short straight flanges 42 and 43 respectively at its opposite ends. A bracket 45 consisting of a metal strip has a pair of spaced lugs 46 struck out of the stock of the intermediate portion of the bracket, which lugs pivotally support and carry the straps 40 and 41 by means of a bolt 47 which passes through suitable holes formed in the end flanges 42 of the straps 40 and 41 and pivotally connect the straps to the bracket.

It will thus be seen that during the normal installation and operation of the filter in use it will be mounted in accordance with the arrangement shown in Fig. 1. However, whenever it is desired or necessary to inspect and/or replace the filter cartridge unit, the filter casing 10 may be released from the upper clamping device 18 by disengagement of the straps 20 and 21 from the casing through manual outward movement of the toggle lever 33 in a direction away from the strap 20 and dismantling of the toggle lever 33 and the draw bolt 32 from the hooks 27 and 28 of the straps 20 and 21 whereby the latter may be swung apart and the filter casing may be swung downwardly about the pivot bolt 47 in order to position the casing 10 bodily into an accessible position for ready removal of the cover 15 and the filter element (not shown) within the casing.

In Figs. 9 and 10 I have illustrated a modified form of mounting which consists of a pair of front and rear plate members 50 and 51 respectively which are hingedly connected to each other by a hinge 52 at a side edge as shown in Fig. 9. As there illustrated, the assembly includes the filter casing 54 which is suitably secured by bolts 55 to the front plate 50 and the entire filter assembly is movable bodily from the closed position of the plates 50 and 51 shown in Fig. 10 to their opened relationship as illustrated in Fig. 9 for swinging the entire filter assemblage outwardly about the pivot of the hinge for positioning of the filter into a side position for affording easy and quick access to the cover of the casing for expeditious inspection and/or replacement of the filtering material.

In Figs. 11 and 12 there is shown another modification consisting of plates 60 and 61 which are hinged together at their bottom edges by the hinge 63 whereby the filter device (not shown) when secured to the front plate 60 by means of suitable bolts having engagement with the internally screw threaded bolt holes 64 will permit the entire filter assembly to be tilted downwardly into an accessible position at a different level for examination and/or replacement of the filtering element within the casing.

In Figs. 13 and 14 another modified form of the invention is shown in which the plate members 70 and 71 are mounted upon a stud 72 for sidewise swivelling or rotary movement.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A filter of the type permanently connected to the lubricating system of an internal combustion engine in a vehicle, comprising a filter casing having inlet and outlet openings and a removable cover, a replaceable cartridge between said inlet and outlet openings, flexible conduits connecting said inlet and outlet openings to said lubricating system, a device for sustaining the filter, said device comprising two parts, means for mounting both of said parts on a support forming a part of the vehicle and in a position in which the cartridge cannot be removed from the casing, a carrier connected to the casing, means for pivotally mounting said carrier on one of said parts, and means on the other of said parts for detachably engaging said casing for assisting in retaining the filter in working position whereby the casing may be released from one part and swung bodily with reference to the other part without disconnection of said conduits for removal and replacement of the cartridge in said casing.

2. A filter of the type permanently connected to the lubricating system of an internal combustion engine in a vehicle, comprising a filter casing having inlet and outlet openings and a removable cover, a replaceable cartridge between said inlet and outlet openings, flexible conduits connecting said inlet and outlet openings to said lubricating system, a device for sustaining the filter, said device comprising two parts, means for mounting both of said parts on a support forming a part of the vehicle and in a position in which the cartridge cannot be removed from the casing, a band connected to the casing for carrying the casing, means for pivotally mounting said band on one of said parts, and a band on the other of said parts for detachably engaging said casing for assisting in retaining the filter in working position whereby the casing may be released from one part and swung bodily with reference to the other part without disconnection of said conduits for removal and replacement of the cartridge in said casing.

JAMES W. WILKINSON.